(12) United States Patent
Cattaneo (10) Patent No.: US 11,274,689 B2
(45) Date of Patent: Mar. 15, 2022

(54) HIDDEN JOINING SYSTEM WITH FRONT ACTIVATION FOR A BOTTOM OF FURNITURE AND FURNISHING ITEMS

(71) Applicant: Leonardo S.r.l., Figino Serenza (IT)

(72) Inventor: Carlo Cattaneo, Figino Serenza (IT)

( * ) Notice: Subject to any disclaimer, the term of this patent is extended or adjusted under 35 U.S.C. 154(b) by 521 days.

(21) Appl. No.: 16/308,499

(22) PCT Filed: Jun. 28, 2017

(86) PCT No.: PCT/EP2017/065980
§ 371 (c)(1),
(2) Date: Dec. 10, 2018

(87) PCT Pub. No.: WO2018/007223
PCT Pub. Date: Jan. 11, 2018

(65) Prior Publication Data
US 2019/0271346 A1    Sep. 5, 2019

(30) Foreign Application Priority Data

Jul. 7, 2016 (IT) .......................... 102016000070711

(51) Int. Cl.
*F16B 12/20* (2006.01)
*F16B 12/46* (2006.01)
*A47B 47/04* (2006.01)
*A47B 96/06* (2006.01)

(52) U.S. Cl.
CPC .......... *F16B 12/2054* (2013.01); *F16B 12/46* (2013.01); *A47B 47/042* (2013.01); *A47B 96/068* (2013.01); *A47B 2230/02* (2013.01); *F16B 2012/2045* (2013.01)

(58) Field of Classification Search
CPC ..... A47B 47/042; A47B 96/06; A47B 96/061; A47B 2230/07; A47B 2230/12; F16B 12/2036; F16B 12/2054; F16B 12/2063; F16B 12/46; F16B 2012/2045;
(Continued)

(56) References Cited

U.S. PATENT DOCUMENTS 3,884,002 A * 5/1975 Logie .................... E04B 1/6162
                                                           52/285.2
4,116,573 A * 9/1978 Fuchs ................... F16B 5/0088
                                                           403/264
(Continued)

FOREIGN PATENT DOCUMENTS

EP    2839761         2/2015
EP    2839761 A1 *    2/2015   ........... A47B 91/028
(Continued)

*Primary Examiner* — Amber R Anderson
*Assistant Examiner* — Alexus Camero
(74) *Attorney, Agent, or Firm* — Themis Law (57) ABSTRACT

A hidden joining system with front activation for a bottom of a piece of furniture and furnishing items includes a front joining unit and a rear joining unit positioned between a bottom and a shoulder of the furniture, wherein each front and rear joining unit is attached beneath the thickness of the bottom of the furniture, wherein symmetry axes of the two front and rear joining units lie on a plane external and parallel to a center plane of the bottom and the front joining unit has a transmission element toward the rear joining unit.

8 Claims, 13 Drawing Sheets

(58) Field of Classification Search
CPC ..... F16B 2012/2072; F16B 2012/2081; Y10T 403/7096; Y10T 403/73
USPC .................................. 403/DIG. 12, DIG. 13
See application file for complete search history.

(56) References Cited

U.S. PATENT DOCUMENTS

| | | | | |
|---|---|---|---|---|
| 4,991,805 | A * | 2/1991 | Solak | F16M 7/00 |
| | | | | 248/188.4 |
| 5,472,269 | A * | 12/1995 | Novikoff | A47B 21/00 |
| | | | | 312/195 |
| 2009/0123222 | A1* | 5/2009 | Ho | F16B 12/2009 |
| | | | | 403/81 |
| 2018/0310707 | A1* | 11/2018 | Berloni | F16B 12/2063 |
| 2018/0368574 | A1* | 12/2018 | Cattaneo | A47B 91/028 |
| 2019/0145449 | A1* | 5/2019 | Cattaneo | F16B 12/2063 |
| | | | | 403/7 |
| 2019/0345965 | A1* | 11/2019 | Cattaneo | F16B 12/14 |
| 2019/0387882 | A1* | 12/2019 | Cattaneo | A47B 91/02 |
| 2020/0196755 | A1* | 6/2020 | Cattaneo | A47B 91/005 |
| 2020/0359792 | A1* | 11/2020 | Cattaneo | F16B 12/2063 |

FOREIGN PATENT DOCUMENTS

| | | | | |
|---|---|---|---|---|
| WO | 2005115199 | | 12/2005 | |
| WO | WO-2005115199 | A1 * | 12/2005 | ........... A47B 91/028 |

\* cited by examiner

HIDDEN JOINING SYSTEM WITH FRONT ACTIVATION FOR A BOTTOM OF FURNITURE AND FURNISHING ITEMS

The present invention relates to a hidden joining system with front activation for a bottom of furniture and furnishing items.

Various types of joining systems are known, such as that object of European patent application EP 930436 A1 which provides a cam element for activating expandable gripping means or in any case an activation mechanism of the joint which require holings in the panels, having a certain complexity.

Other joining systems between a bottom of a piece of furniture or base and a shoulder of a piece of furniture, are also known in the furnishing industry in general; the joining is currently effected by positioning a pin screwed into a hole of the shoulder and, for example, a butt or similar constraining element inserted in a hole formed in the bottom or base of the furniture.

In order to effect this joining, a relatively large hole must be produced in the bottom or base of the furniture, which houses the butt or similar constraining element which receives a grub screw in a threaded portion of the same.

If the hole is visible, it is not particularly acceptable for the user.

Attempts have been made to overcome this drawback by covering the hole thus formed with a specific cap in order to try and restore the aesthetical appearance of the parts involved in the joining as far as is possible. Visible holes, in fact, do not allow a satisfactory appearance and must be covered by caps. The presence of caps, however, causes hindrances and obstacles for the positioning of objects on the bottom or base of the furniture, in any case creating disturbance for the user.

It should also be taken into account that an activation from above, in particular for lower joints, is not always easy, in the presence of limited spaces between shelves or minimum distances from the bottom of the furniture or rear wall of the furniture, and, as already indicated, visible holes are required which are greatly criticized by the users.

WO 2005/115199 shows a levelling system for a piece of furniture.

The general objective of the present invention is therefore to provide a hidden joining system with front activation for a bottom of furniture and furnishing items which is capable of solving the drawbacks of the known art described above in an extremely simple, economical and particularly functional manner.

A further objective of the present invention is to provide a joining system which, in addition to having a minimum visibility on the part of the observer, and therefore a high aesthetical value, can be easily accessible from the free area remaining between the bottom and floor where the furniture is positioned.

Another objective of the present invention is to provide a joining system between end portions of vertical walls and bottom of a piece of furniture or furnishing item which does not create a significant encumbrance between the bottom or base and the floor.

The above objectives are achieved by a joining system produced according to the independent claim 1 and following subclaims.

The structural and functional characteristics of the present invention and its advantages with respect to the known art will appear even more evident from the following description, referring to the enclosed schematic drawings, which show embodiment examples of the invention itself, all having the same innovative concept. In the drawings.

With reference in general to the figures, these show embodiments of a hidden joining system with front activation for a bottom of a piece of furniture or furnishing items according to the present invention.

This type of joining system is destined for being inserted in a piece of furniture M comprising a bottom or base 12 suitable for being positioned between two side shoulders 11 (one of which is partially shown). This joining system is activated from the front with respect to the furniture M through a space S defined by the bottom 12 and the floor P on which the furniture M rests.

In particular, this type of joining system must provide, in combination, at least one front joining unit (UGA) and at least one rear joining unit (UGP), close to a rear wall (not shown) having more difficult access for the assembly of the furniture M.

The front joining unit UGA and rear joining unit UGP are positioned between the bottom 12 and at least one shoulder 11 of the furniture M. Each front joining unit UGA and rear joining unit UGP is equipped with a connection group GC and a blocking group GB, as better described hereunder.

More specifically, each front and rear joining unit UGA, UGP is arranged attached beneath the thickness of the bottom 12 of the furniture M. Symmetry axes X of the two front and rear joining units UGA, UGP of the bottom 12 to the shoulder 11 lie on a plane A interspaced and parallel to a centre plane B of the bottom 12.

Furthermore, the front joining unit UGA also provides, in addition to the connection group GC, an actuating and support means, such as, for example, a support guide 13 provided with a pass-through hole 14 towards the corresponding rear joining unit UGP.

In the example shown in FIGS. 1 to 4, it can be seen how the front joining unit UGA and the rear joining unit UGP of the joining system according to the invention comprise a body 16, for example prismatic and partly rounded, that can be associated with both the bottom 12 and the shoulder 11.

More specifically, said joining units UGA or UGP contain at least a pair of snap-in or pressure plugs 18 (so-called "duebel") (or other equivalent fixing elements), which are housed in at least a pair of blind holes 17 formed vertically in the bottom 12 downwards. Furthermore, it can be observed how the shoulder 11 provides a seat S1 in the form of a horizontal blind hole 19 in which a threaded end 20 of a pin 21 is positioned.

The pin 21 is housed in a horizontal hole 22 of the body 16, said hole 22 being aligned with the hole 19 of the shoulder 11 of the furniture M. The pin 21, in its protruding part, contains a housing 23 for the tip of a blocking grub screw 24. The blocking grub screw 24 is screwed into a threaded hole 25 of a butt 15. The butt 15 is positioned in the body 16 in a hole 28 also formed in a direction perpendicular to the blind hole 22 of the body 16 intersecting the same.

Figure 1:
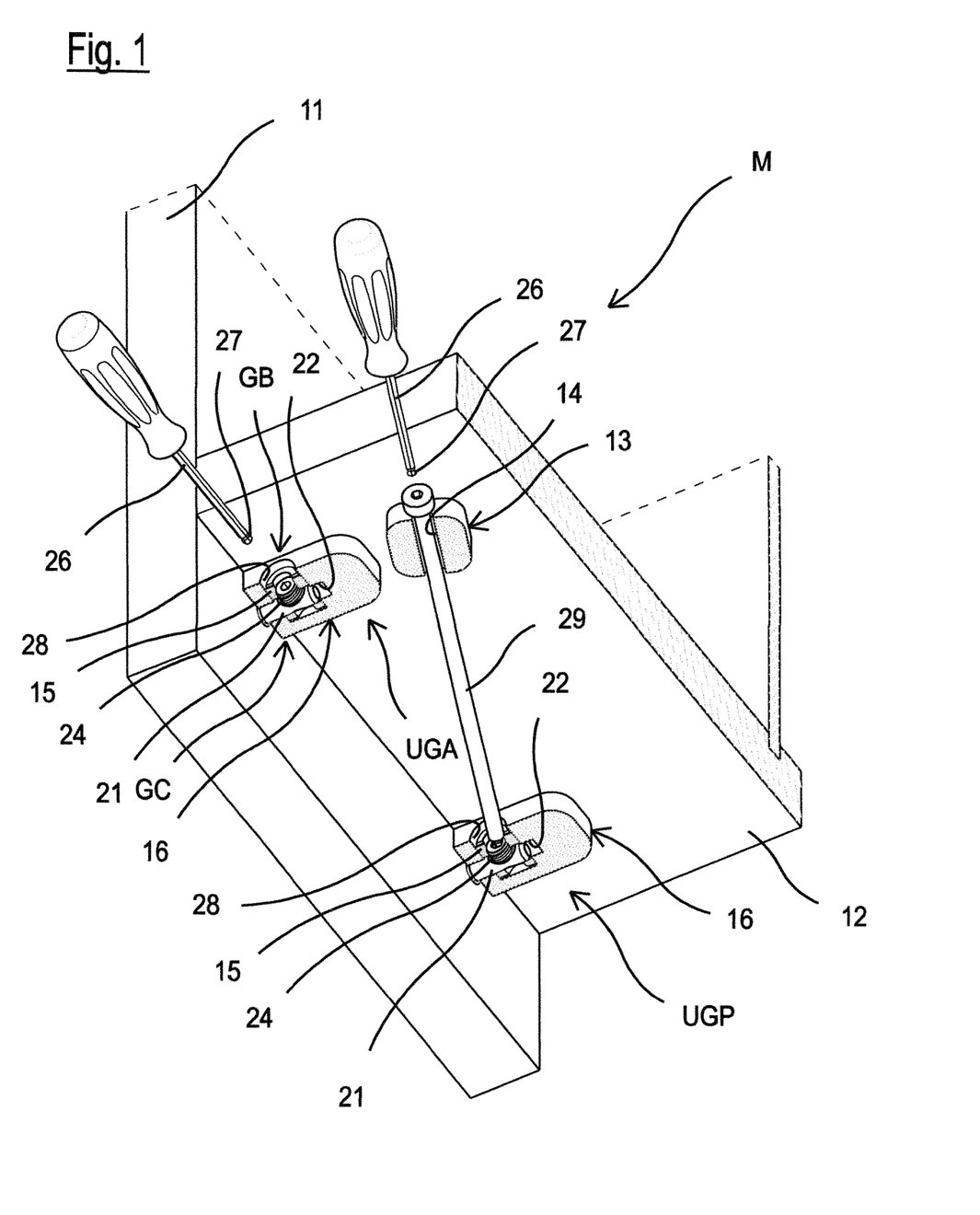
FIGS. 1 and 2 are two perspective views of a first embodiment, a partial sectional view and an enlarged view with respect to the previous view according to a different sectional line, of a hidden joining system with front activation beneath the bottom or base of a piece of furniture produced according to the present invention with a front butt having direct activation and a rear butt that can be activated with a rod passing into a separate support guide.
Figure 2:
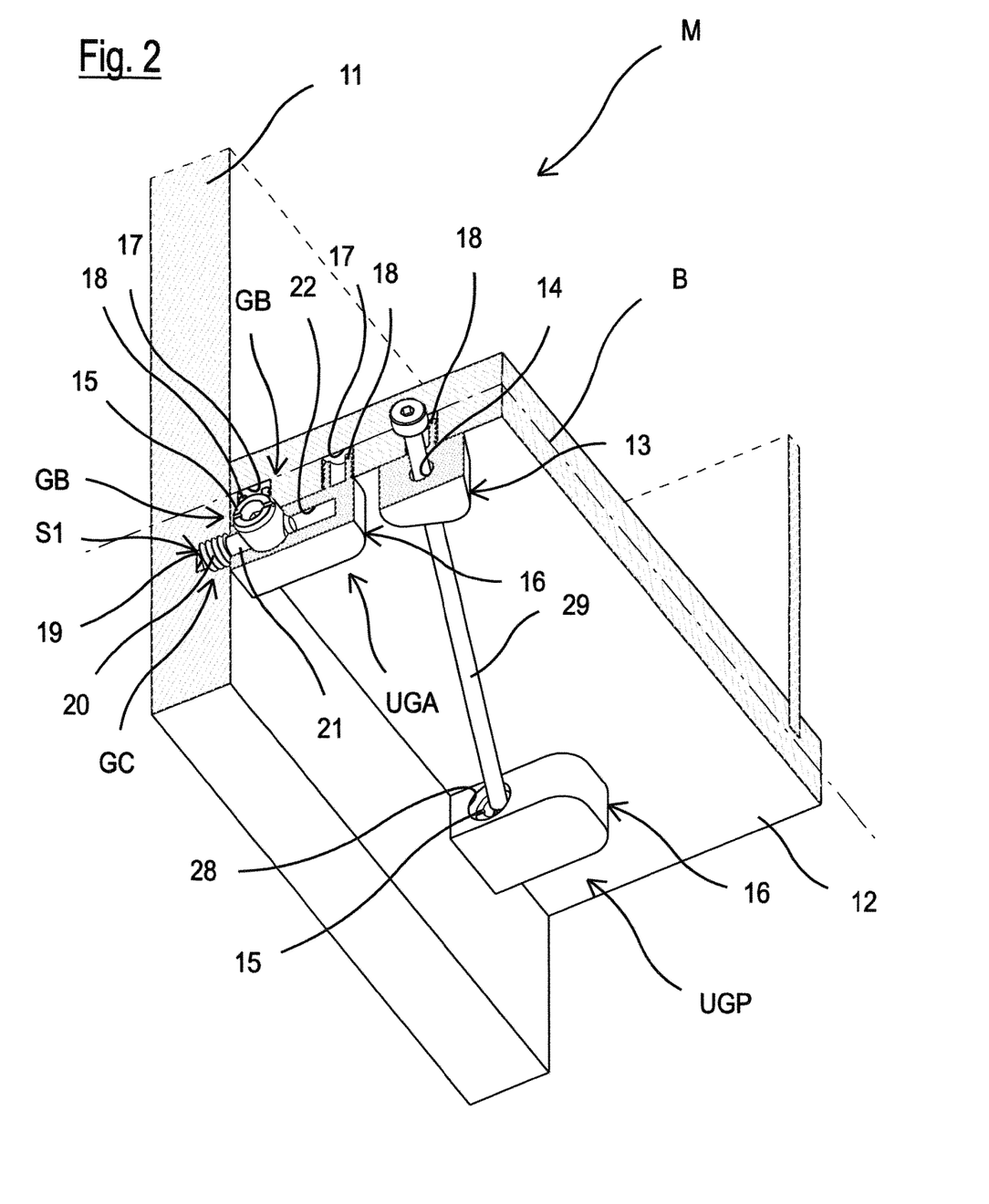
Figure 3:
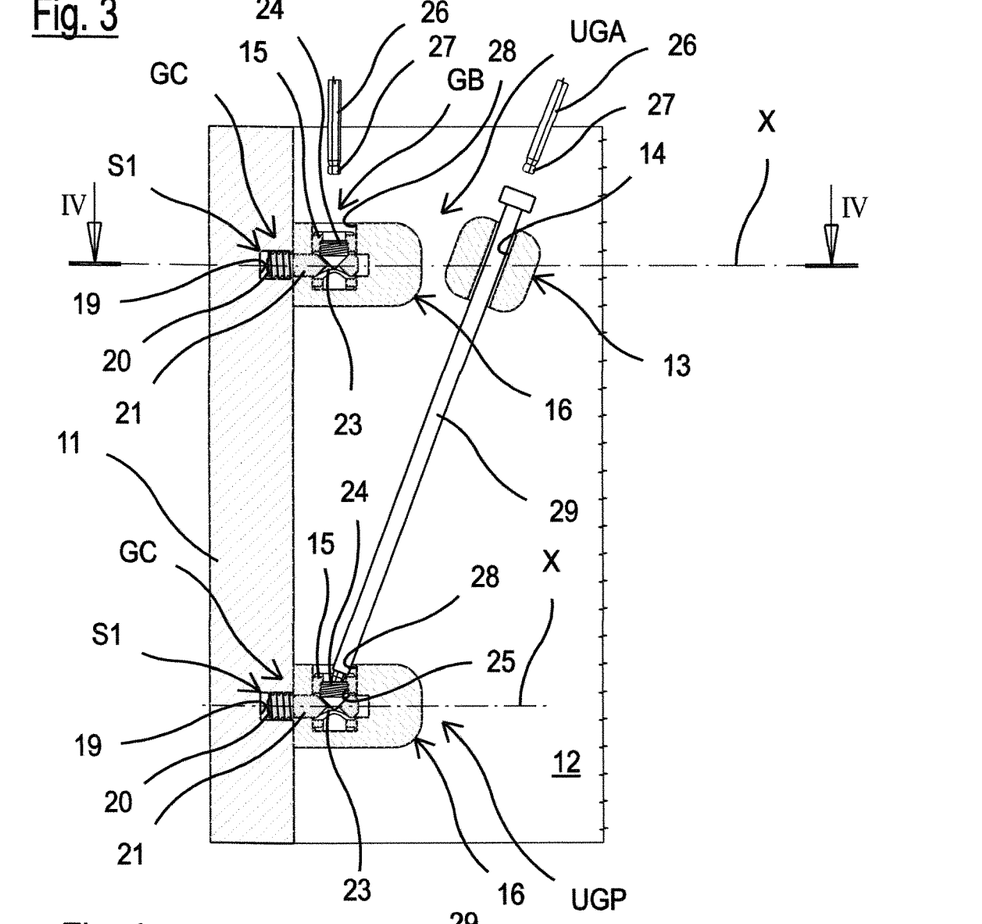
FIGS. 3 and 4 are respectively a partially sectional plan view from below of FIG. 1, and a sectional view according to the line IV-IV of FIG. 3.
Figure 4:
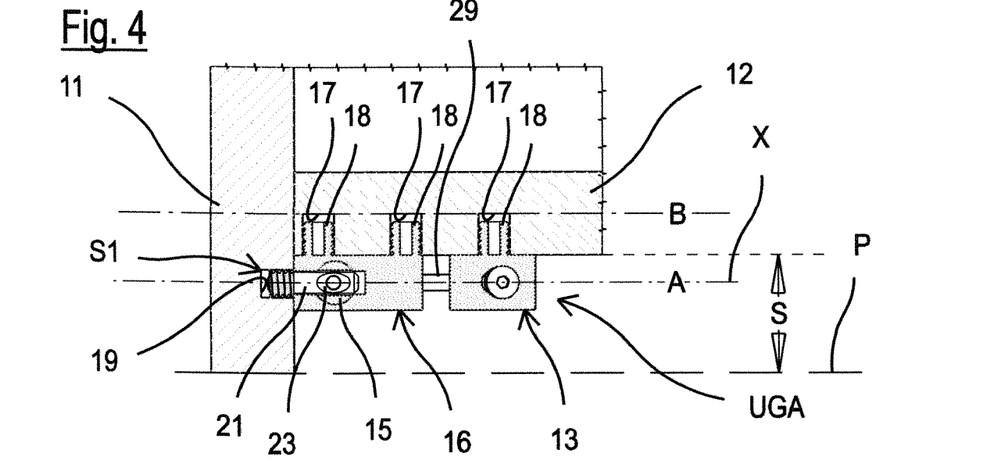

Said pin 21 defines a connection group GC for stably interconnecting the shoulder 11 and the base 12 and in this example, the butt 15 and the grub screw 24 define the blocking group GB suitable for acting on the above-mentioned connection group GC composed of the pin. The connections are obtained with the insertion of the pin in the respective hole 22 and with activation of the grub screw 24 blocking the pin 21, as can be seen in FIG. 3.

Figure 5:
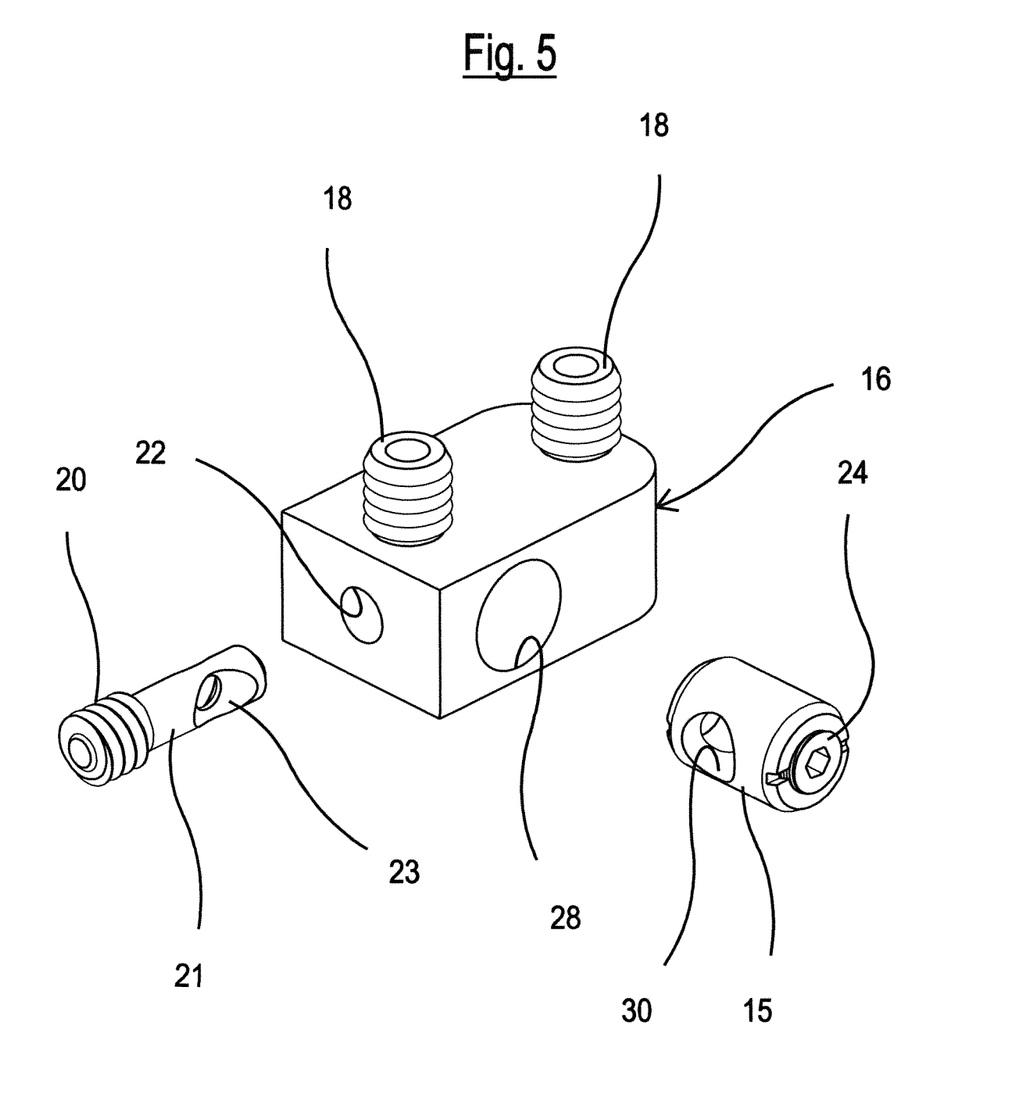
FIG. 5 is an enlarged exploded view of a part of the joining unit shown in the previous FIGS. 1 to 4.
Figure 6:
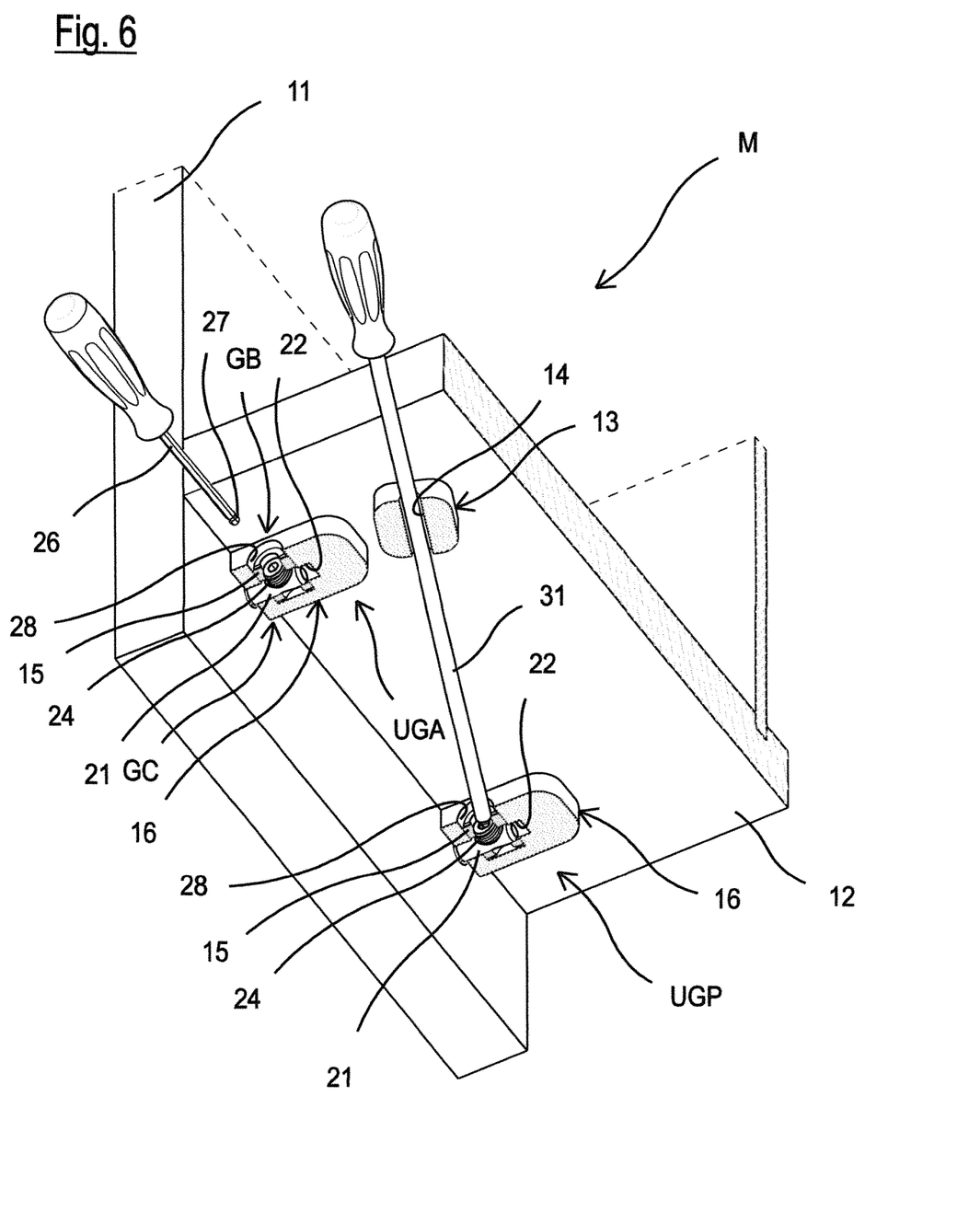
FIGS. 6 and 7 are two perspective views of a second embodiment, a partially sectional view and an enlarged view with respect to the previous view according to a different sectional line, of a hidden joining system with front activation beneath the bottom or base of a piece of furniture produced according to the present invention with a front butt having direct activation and a rear butt that can be activated with a rod passing into a separate support guide.
Figure 7:
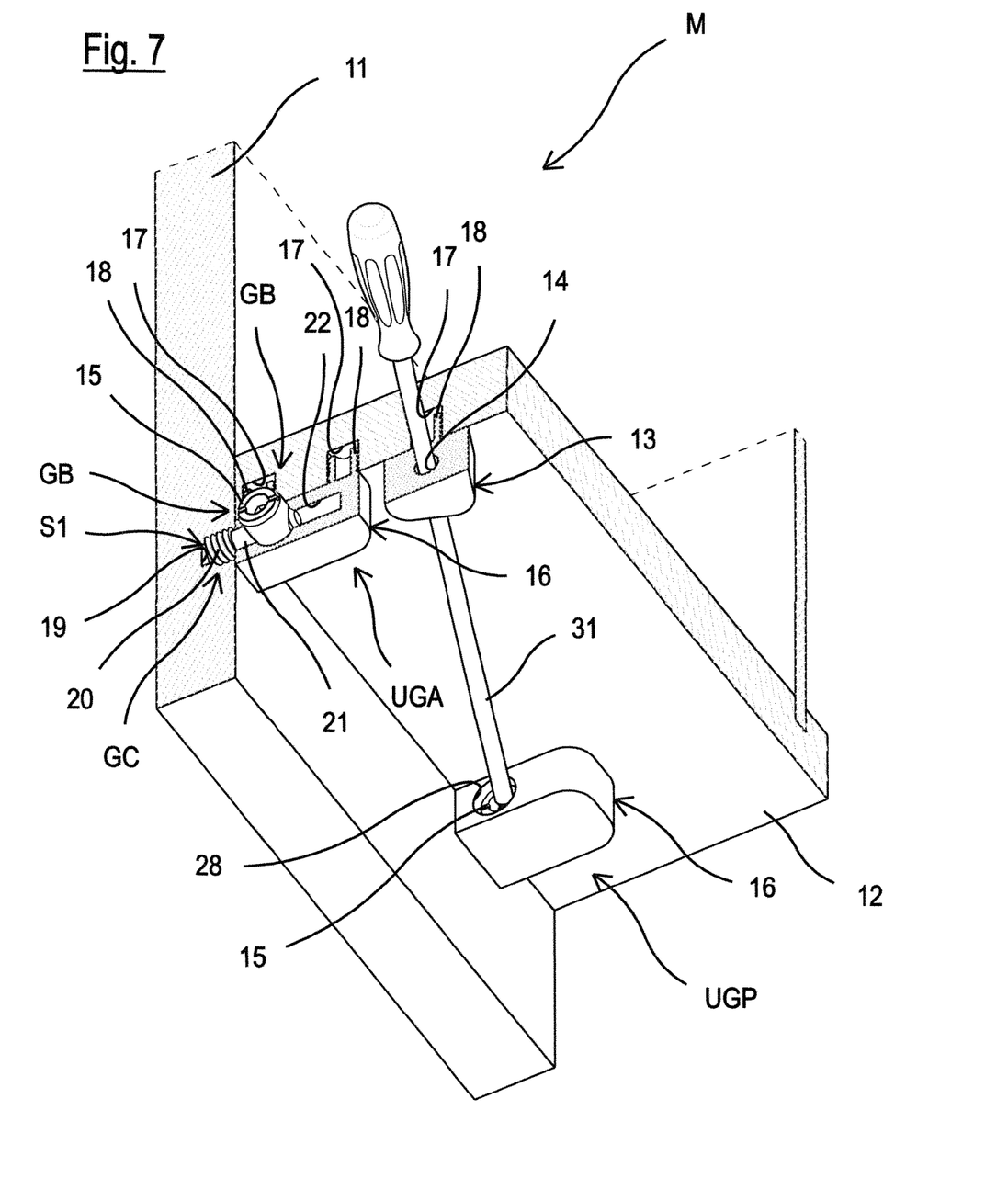
Figure 8:
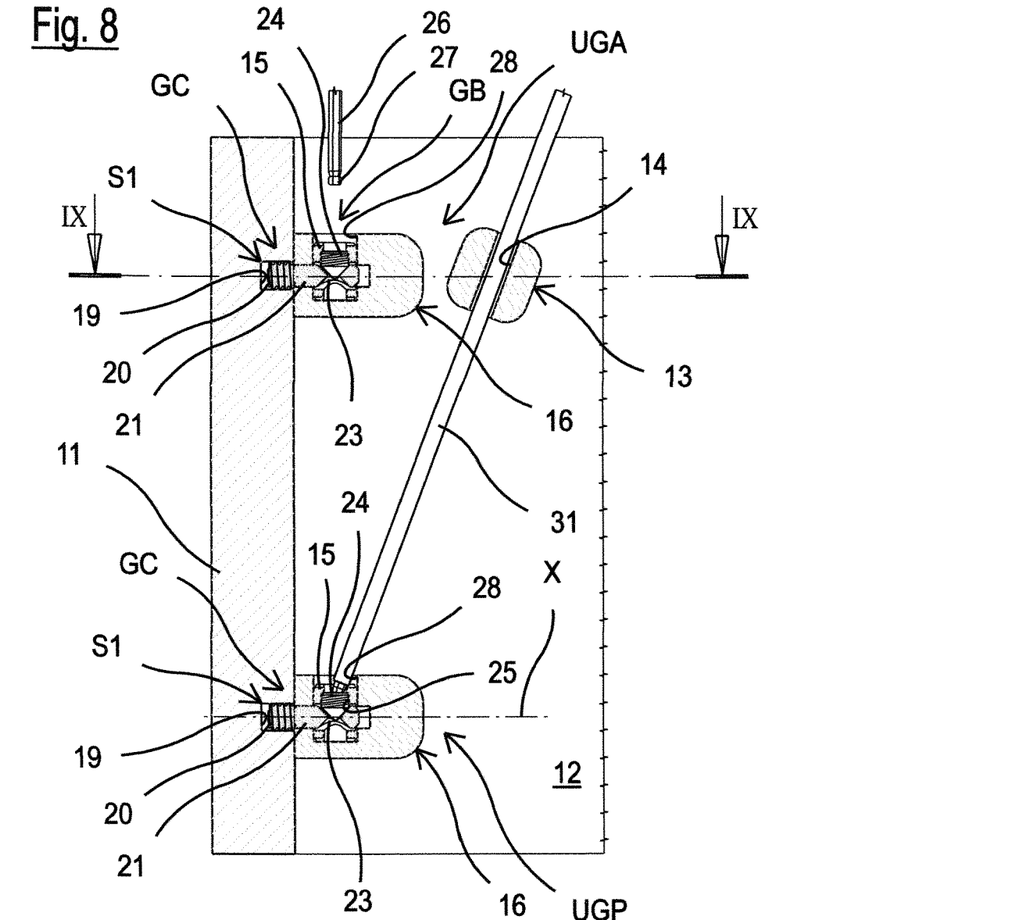
FIGS. 8 and 9 are respectively a partially sectional plan view from below of FIG. 6, and a sectional view according to the line IX-IX of FIG. 8.
Figure 9:
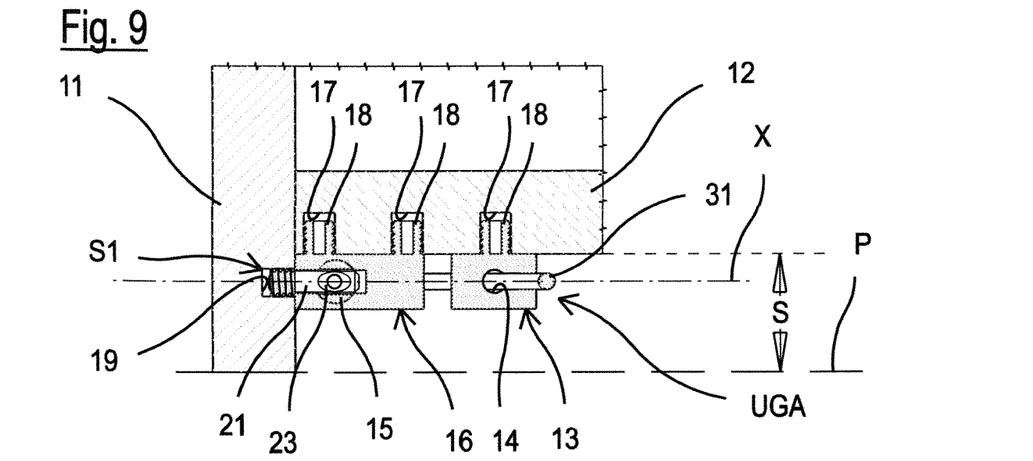
Figure 10:
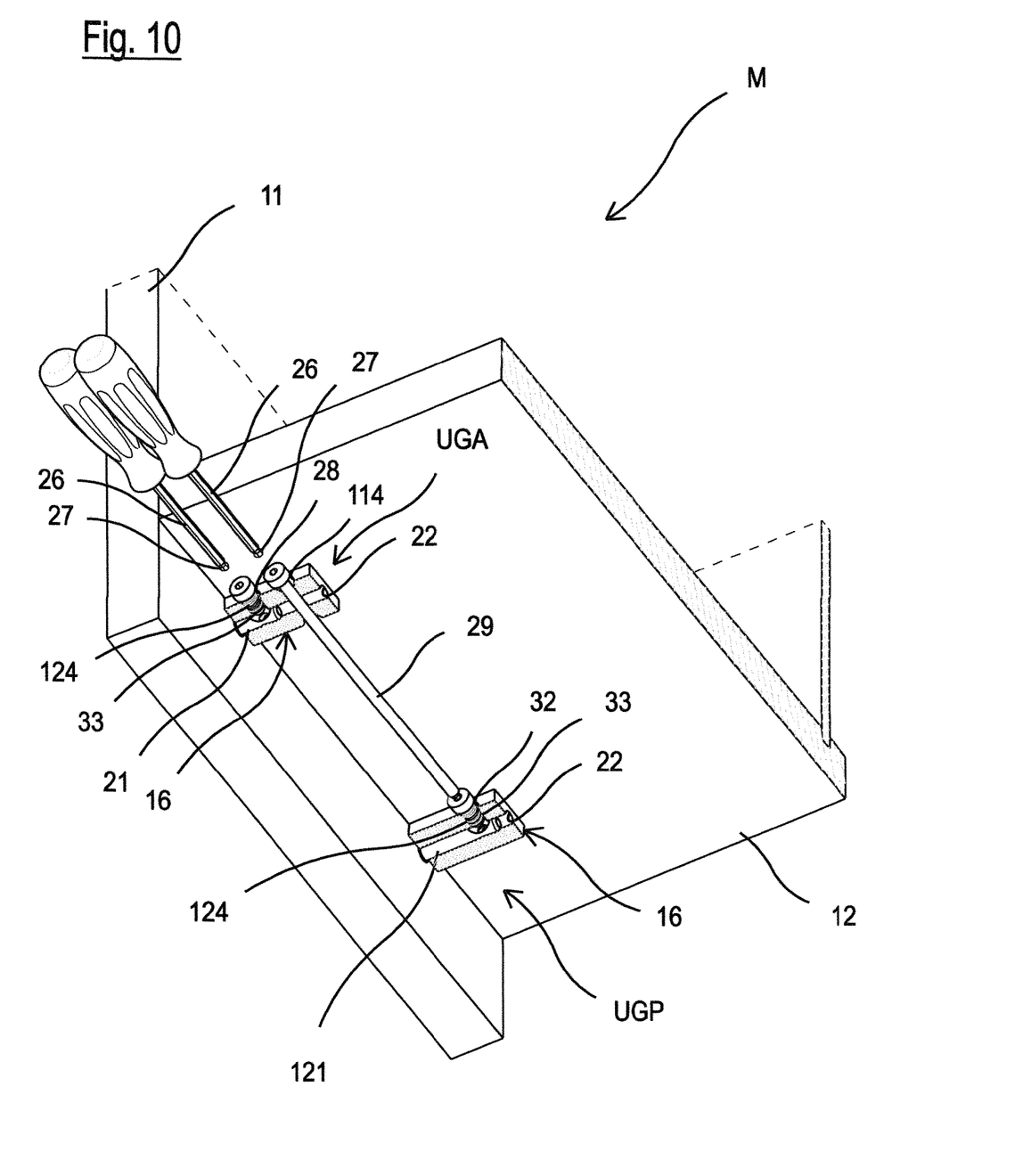
FIGS. 10 and 11 are two perspective views of a third embodiment, a partial sectional view and an enlarged view with respect to the previous view according to a different sectional line, of a hidden joining system with front activation beneath the bottom or base of a piece of furniture produced according to the present invention with a front screw having direct activation and a rear screw that can be activated with a rod passing into the front joining part.
Figure 11:
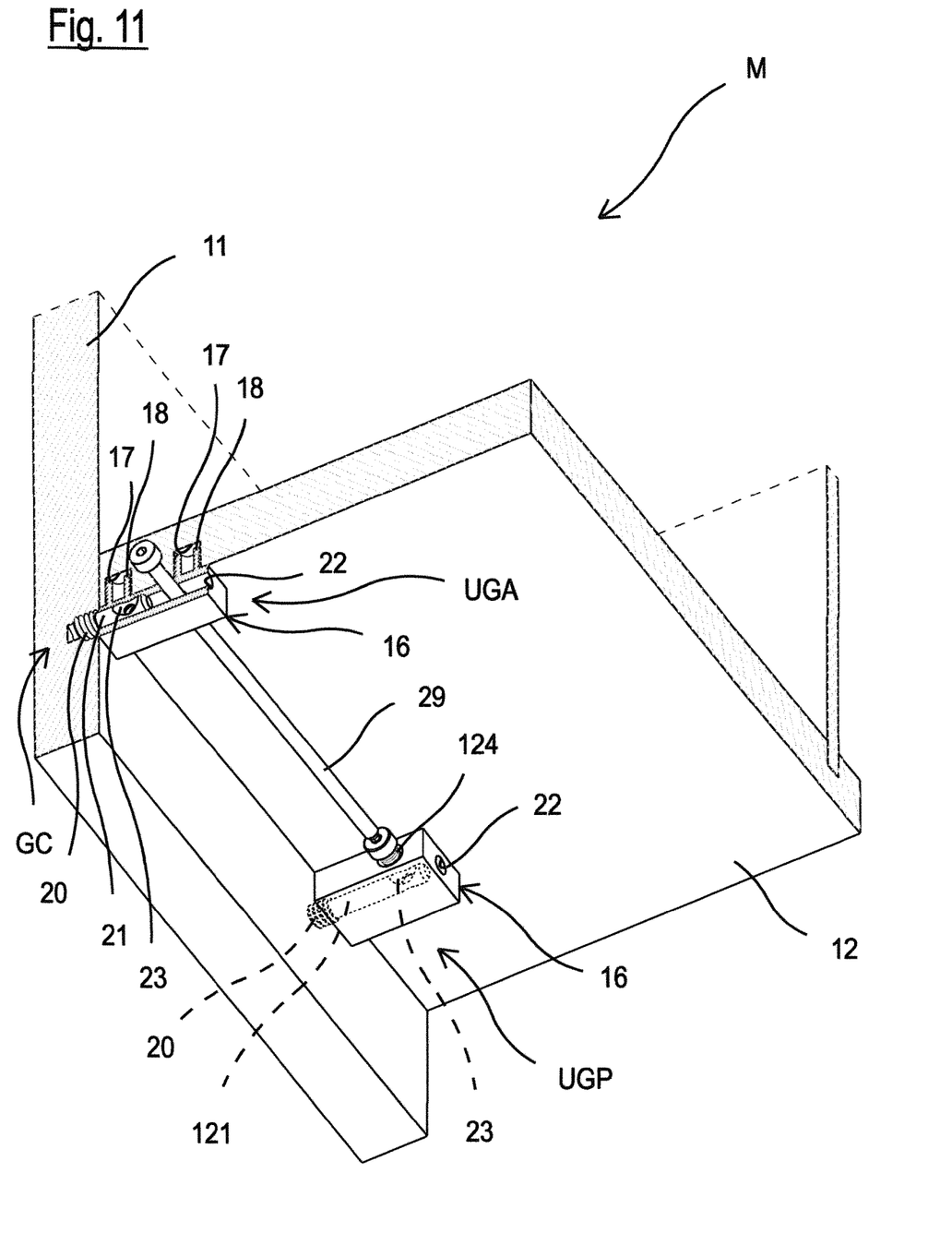
Figure 12:
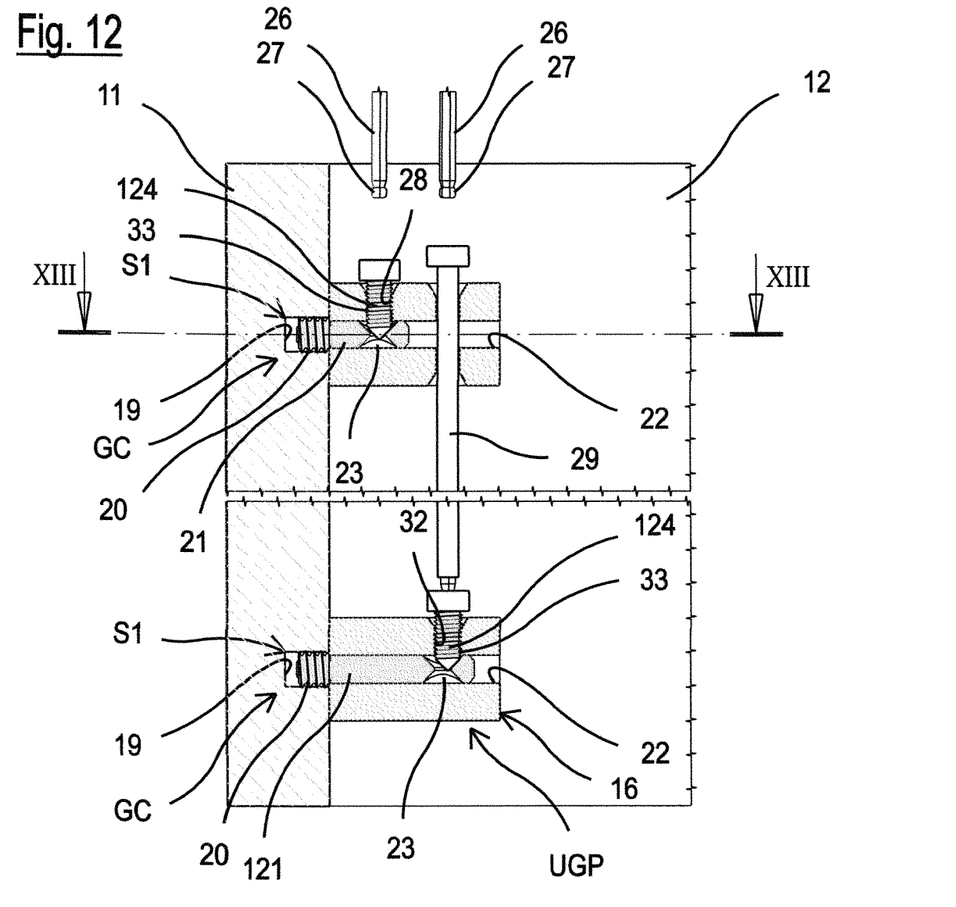
FIGS. 12 and 13 are respectively a partially sectional plan view from below of FIG. 10, and a sectional view according to the line XIII-XIII of FIG. 12.
Figure 13:
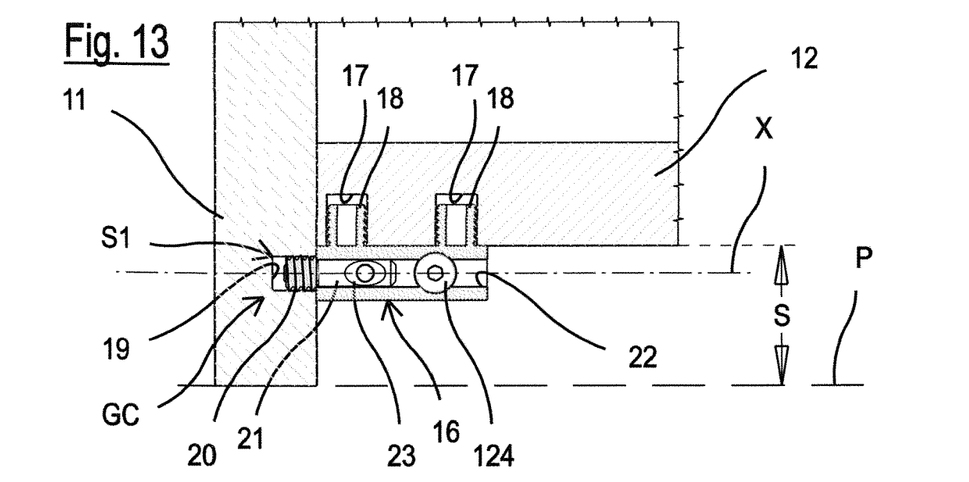
Figure 14:
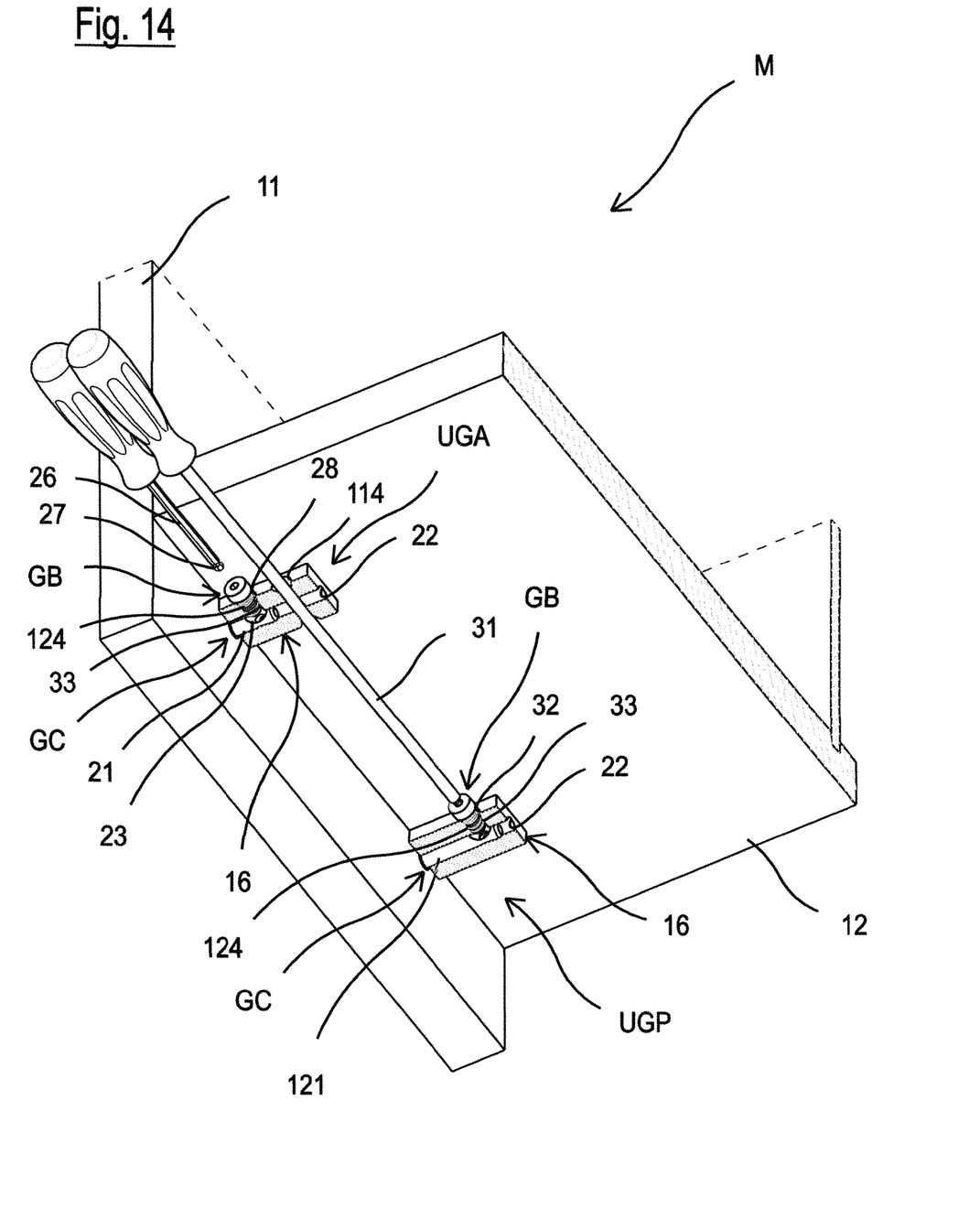
FIGS. 14 and 15 are two perspective views of a fourth embodiment, a partial sectional view and an enlarged view with respect to the previous view according to a different sectional line, of a hidden joining system with front activation beneath the bottom or base of a piece of furniture produced according to the present invention with a front screw having direct activation and a rear screw that can be activated with a screwdriver passing into the front joining part.
Figure 15:
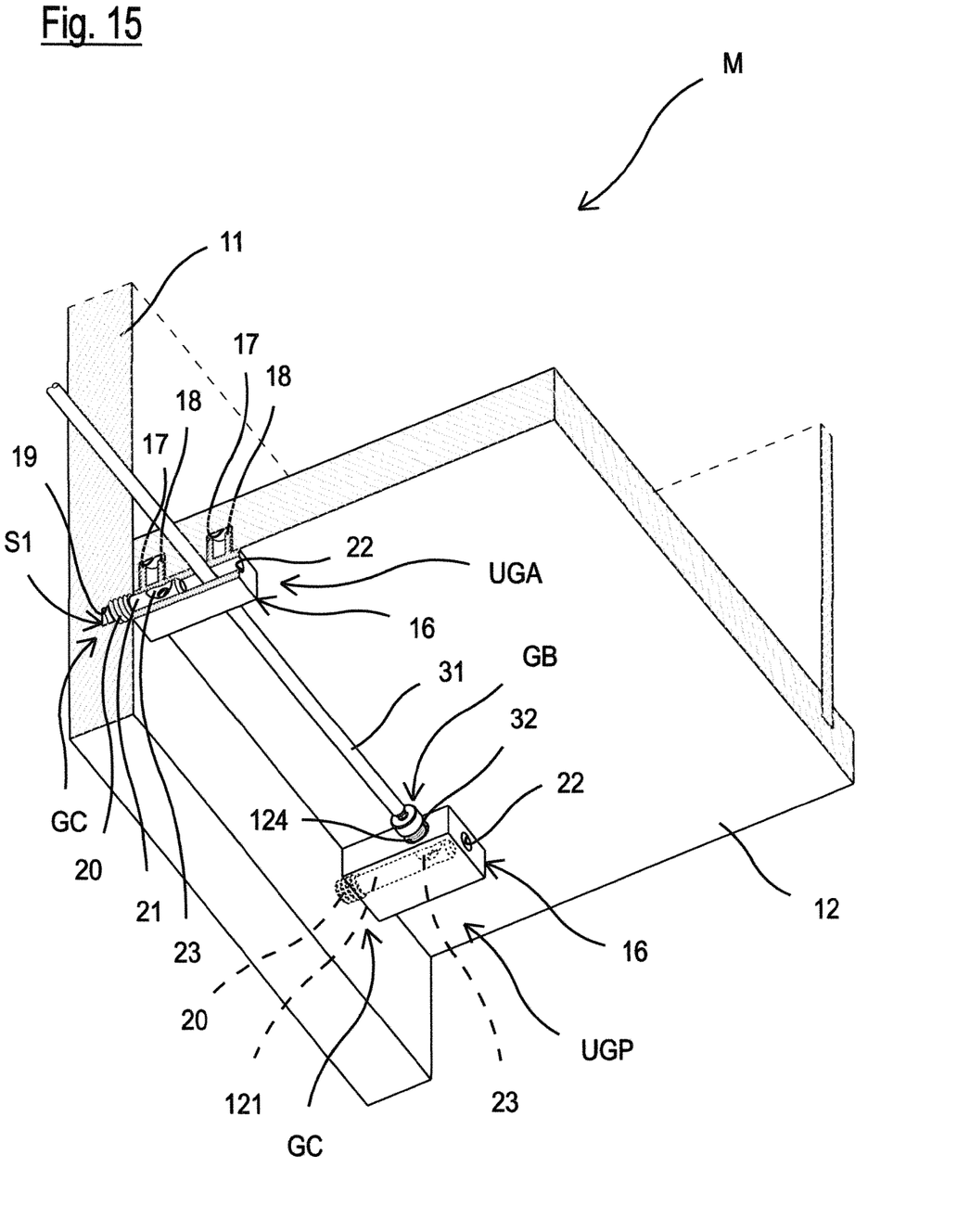
Figure 16:
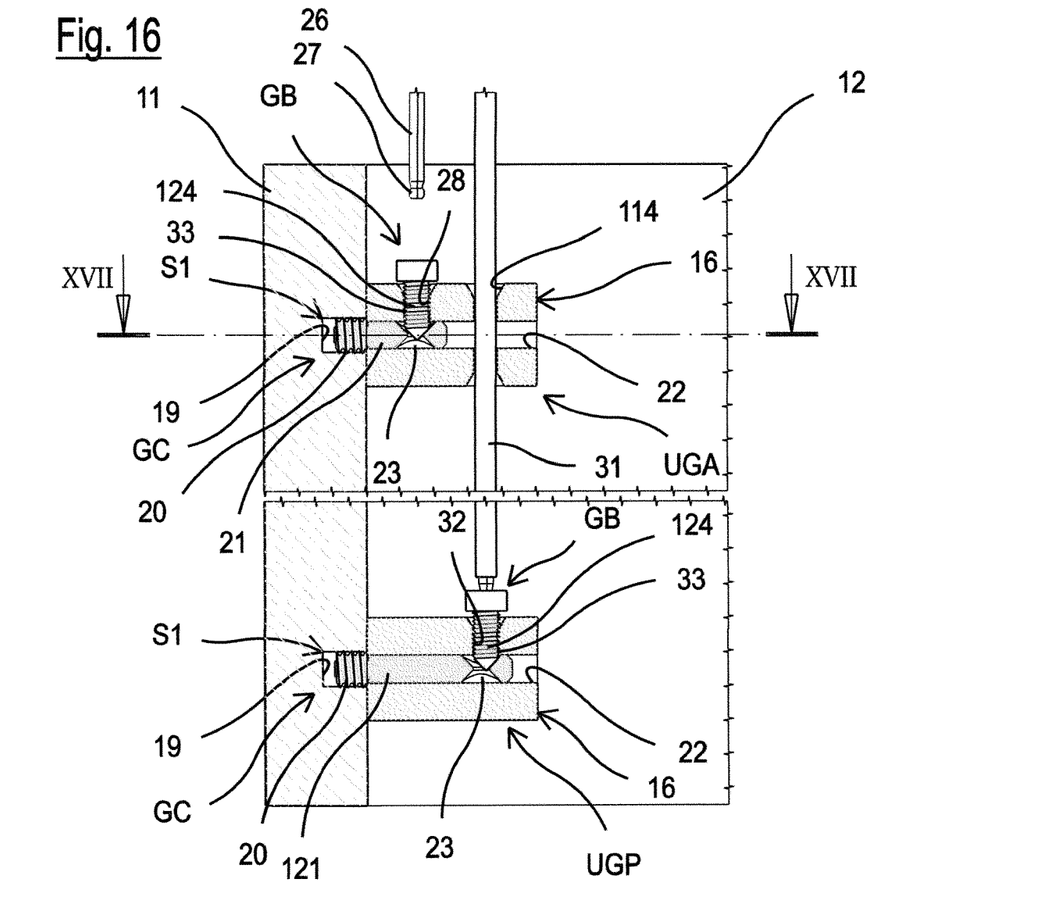
FIGS. 16 and 17 are respectively a partially sectional plan view from below of FIG. 14, and a sectional view according to the line XVII-XVII of FIG. 16.
Figure 17:
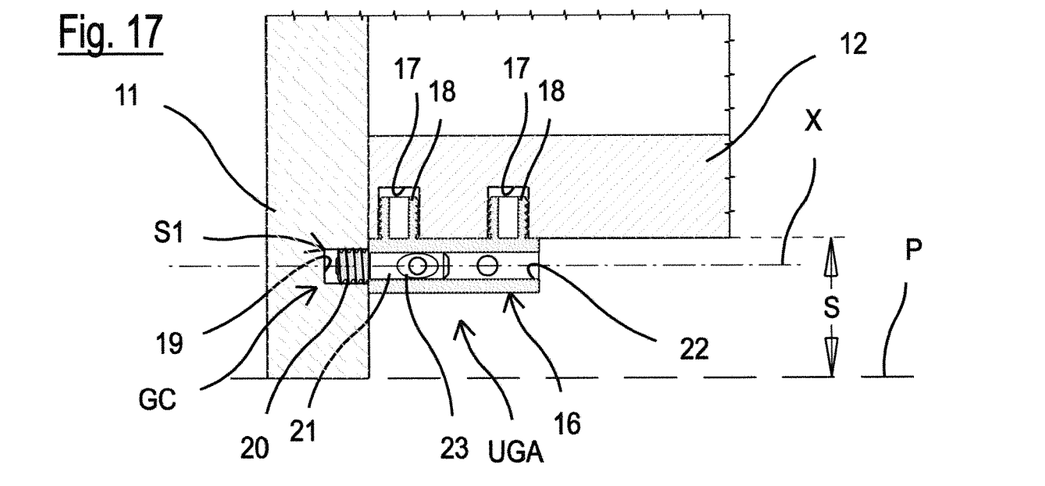

FIG. 5 shows in an enlarged exploded view, some of the parts of a joining unit shown in the previous FIGS. 1 to 4. This figure, in fact, illustrates the body 16 provided with the pair of plugs 18 and with holes 22 and 28. The pin 21 with a threaded end 20 and housing 23 is also shown. The butt 15 comprises the grub screw 24 and provides a pass-through hole 30 for the pin 21.

In order to activate the functioning, a shaped tool 26, for example having a hexagonal head 27, is suitable for being inserted inside a complementary seat in the head of the grub screw 24 passing through the hole 28 of the body 16 so as to be coupled with the same to cause its rotation.

This arrangement has been described for the front joining unit UGA, but is completely equivalent to the rear joining unit UGP where the same reference numbers are used, when possible. It should also be taken into account that the support guide 13, when formed as a separate body, also provides a snap-in or pressure plug 18 which is housed in the blind hole 17 formed vertically in the bottom 12 downwards. This completes the front joining unit UGA.

The same shaped tool 26, with a hexagonal head 27 is also provided for the use and assembly and/or disassembly of the rear joining unit UGP. Said hexagonal head 27 is inserted inside a complementary seat of an actuating rod 29 which is positioned and passes into the actuating and support means, in this example into the hole 14 of the support guide 13.

In this example, it is shown that a true and proper joining of the blocking group GB is achieved through a butt 15 and the grub screw 24 which collaborates with the same, but it is alternatively possible to use a cam element or other blocking system suitable for equivalently cooperating with the connection group GC.

FIGS. 6 to 9 show a second embodiment of the hidden joining system with front activation beneath the bottom or base of a piece of furniture produced according to the present invention. In this example, a front joining unit UGA is provided, which comprises a front butt with direct activation, whereas the rear butt can be activated with a long-stemmed screwdriver 31 passing into the separate support guide 13 in a pass-through hole 14 of the same.

All the same reference numbers are used for this example and the functioning of the system can be immediately understood from the previous example, to which reference should be made.

FIGS. 10 to 13 show a third embodiment of a hidden joining system with front activation beneath the bottom or base of a piece of furniture produced according to the present invention.

Also in this example, the same reference numbers are used, when possible.

This third embodiment provides for a simplification in the joining units, using simple screws 124 which are positioned for fixing the pin 21 inserted in the shoulder 11. The screws 124 are screwed into a threading 33 formed inside the holes 28 and 32. This provision is implemented for both the front joining unit UGA and for the rear joining unit UGP of the joining system according to the invention. This example also shows how the front joining unit UGA can also be simplified by eliminating the support guide 13 as a separate body.

As can be seen from the figures, in fact, the body 16 is in prismatic form, again provided with two snap-in or pressure plugs 18 which are housed in blind holes 17 formed vertically in the bottom 12 downwards.

It can also be seen, moreover, that a pass-through hole 114 is formed in the body 16 of the front joining unit UGA, adjacent and parallel to the blind hole 28, acting as a actuating and support means.

The hole 28 receives a screw 124 whose tip is housed in the seat 23 of the pin 21. The rod 29, on the other hand, which activates the screw 124 housed in an internal threading 33 formed in the hole 32 in the body of the rear joining unit UGP of the joining system according to the present invention, is positioned and passes through the pass-through hole 114. In this case, an elongated pin 121 is provided, and the hole 22, formed in the body 16 intersecting with the holes 28, 114 and 32, is also produced as a pass-through hole with a simpler holing process.

Also in this case, for the functioning, reference should be made to what has been specified for the previous examples and to the figures which are self-explanatory.

Finally, FIGS. 14 to 17 show a fourth embodiment of a hidden joining system with front activation beneath the bottom or base of a piece of furniture produced according to the present invention.

In this further example, which is very similar to the previous example, the screw 124 of the front joining unit UGA has direct activation. The screw 124 of the rear joining unit UGP, on the other hand, can be activated with a long-stemmed screwdriver 31 passing into the body 16 of the front joining unit UGA into the pass-through hole 114 which acts as a actuating and support means with said long-stemmed screwdriver 31.

The other characteristics are analogous to those of the previous example and have the same reference numbers for the same elements.

It can thus be seen how a hidden joining system with front activation for a bottom of furniture and furnishing items according to the invention provides a solution to all the problems envisaged in the known art cited above.

Primarily, all visible holes have been eliminated from the furniture and an adjustable joining system is provided which can be activated in the minimum space S between the bottom or base 12 and the floor P from a front position.

The elements of the system have been minimized and are extremely simple to construct and use. The holings in the shoulders and in the bottom or base have also been minimized.

The advantages and innovative characteristics of a hidden joining system with front activation for a bottom of furniture and furnishing items according to the present invention are therefore evident.

The forms and structure for producing a hidden joining system with front activation for a bottom of furniture and furnishing items according to the present invention, as also the materials and assembly modes, can naturally differ from those shown for purely illustrative and non-limiting purposes in the drawings.

The objectives mentioned in the preamble of the description have therefore been achieved.

The protection scope of the present invention is defined by the enclosed claims.

The invention claimed is:

1. A hidden joining system adapted for use in a piece of furniture and furnishing item with a bottom and at least one shoulder, comprising:
   at least one front joining unit; and
   at least one rear joining unit positioned between the bottom and the at least one shoulder,
   wherein symmetry axes of the front and rear joining units lie on a plane interspaced and parallel to a center plane of the bottom,
   wherein said at least one front joining unit provides actuating and support means towards said at least one rear joining unit,
   wherein each front and rear joining unit is attached to the bottom and comprises a body, which contains a connection group and a blocking group,
   wherein said connection group and said blocking group are associated with both the bottom and the shoulder, said connection group, said blocking group and said actuating and support means having a front activation, and
   wherein said body has at least one hole for receiving a pin of said connection group and at least one hole for receiving a joint of said blocking group.

2. The hidden joining system according to claim 1, wherein said actuating and support means are configured as a separate body from said at least one front joining unit.

3. The hidden joining system according to claim 1, wherein said actuating and support means have a pass-through hole towards said at least one rear joining unit.

4. The hidden joining system according to claim 3, wherein said pass-through hole of said actuating and support means is configured to receive a transmission rod or a long-stemmed screwdriver.

5. The hidden joining system according to claim 1, wherein said body of said at least one front joining unit and at least one rear joining unit contains at least one snap-in or pressure plug, which is housed in at least one blind hole formed in the bottom.

6. The hidden joining system according to claim 1, wherein said blocking group includes a grub screw adapted to be screw-inserted into a butt housed in a hole of the body of said at least one front joining unit and said at least one rear joining unit.

7. The hidden joining system according to claim 1, wherein said blocking group includes a screw inserted in an internal threading of said hole of the body of said at least one front joining unit or said at least one rear joining unit.

8. The hidden joining system according to claim 1, wherein said pin of said connection group includes one end housed in a seat of the shoulder and another end housed in said hole of said body of said at least one front joining unit or said at least one rear joining unit, wherein said hole is aligned with a second hole in the shoulder that is shaped as a blind hole of said seat.

* * * * *